US012645796B2

(12) United States Patent
Southgate et al.

(10) Patent No.: US 12,645,796 B2
(45) Date of Patent: Jun. 2, 2026

(54) USING ARTIFICIAL INTELLIGENCE MODELS WITH INTERMEDIATE REPRESENTATIONS TO ANALYZE MALICIOUS FILES

(71) Applicant: CrowdStrike, Inc., Sunnyvale, CA (US)

(72) Inventors: Andrew Southgate, Cambridge (GB); Paul Sumedrea, Bucharest (RO)

(73) Assignee: CrowdStrike, Inc., Sunnyvale, CA (US)

( * ) Notice: Subject to any disclaimer, the term of this patent is extended or adjusted under 35 U.S.C. 154(b) by 155 days.

(21) Appl. No.: 18/423,139

(22) Filed: Jan. 25, 2024

(65) Prior Publication Data

US 2025/0245325 A1      Jul. 31, 2025

(51) Int. Cl.
*G06F 21/56*          (2013.01)
*G06F 8/41*           (2018.01)

(52) U.S. Cl.
CPC ............ *G06F 21/565* (2013.01); *G06F 8/427* (2013.01)

(58) Field of Classification Search
CPC ....... H04L 9/40; H04L 63/1416; H04L 41/16; H04L 63/1433; H04L 63/1425; H04L 63/1408; G06F 21/565; G06F 8/247
See application file for complete search history.

(56) References Cited

U.S. PATENT DOCUMENTS

| | | | |
|---|---|---|---|
| 11,663,334 B1 | 5/2023 | Briliauskas et al. | |
| 11,886,586 B1 * | 1/2024 | Chang ................... | G06F 21/566 |

| | | | | |
|---|---|---|---|---|
| 2020/0042701 A1 * | 2/2020 | Yang | ...................... | G06N 3/045 |
| 2022/0121429 A1 | 4/2022 | Haile et al. | | |
| 2023/0010160 A1 * | 1/2023 | Chen | ........................ | G06N 3/09 |

FOREIGN PATENT DOCUMENTS

| | | |
|---|---|---|
| CN | 111475820 A | 7/2020 |
| CN | 113761529 A | 12/2021 |
| CN | 114254323 A | 3/2022 |
| CN | 115168856 A | 10/2022 |
| CN | 115934090 A | 4/2023 |
| CN | 116432622 A | 7/2023 |

OTHER PUBLICATIONS

Zhu (A Transparent and Multimodal Malware Detection Method for Android Apps, 2019) (Year: 2019).*
Henrik Plate, State of Dependency Management 2023, Endor Labs, Jul. 2023, 24 pp total.
Pascal Maniriho et al., "A Survey of Recent Advances in Deep Learning Models for Detecting Malware Attacks in Desktop and Mobile Platforms", Preprint submitted to Journal of LATEX Templates, Sep. 9, 2022, 24 pp total.

* cited by examiner

*Primary Examiner* — Brian F Shaw
(74) *Attorney, Agent, or Firm* — Womble Bond Dickinson (US) LLP

(57)          ABSTRACT

The present disclosure provides an approach of analyzing multiple modalities of a file to produce multiple analysis tokens. Each one of the analysis tokens corresponds to a respective modality of the file. The approach provides the multiple analysis tokens to an artificial intelligence model, which is trained to produce an intermediate representation vector based on the plurality of analysis tokens. In turn the approach uses the artificial intelligence model to produce, based on the intermediate representation vector, a classification that indicates whether the file corresponds to a cybersecurity threat.

20 Claims, 6 Drawing Sheets

100 ⟋

300

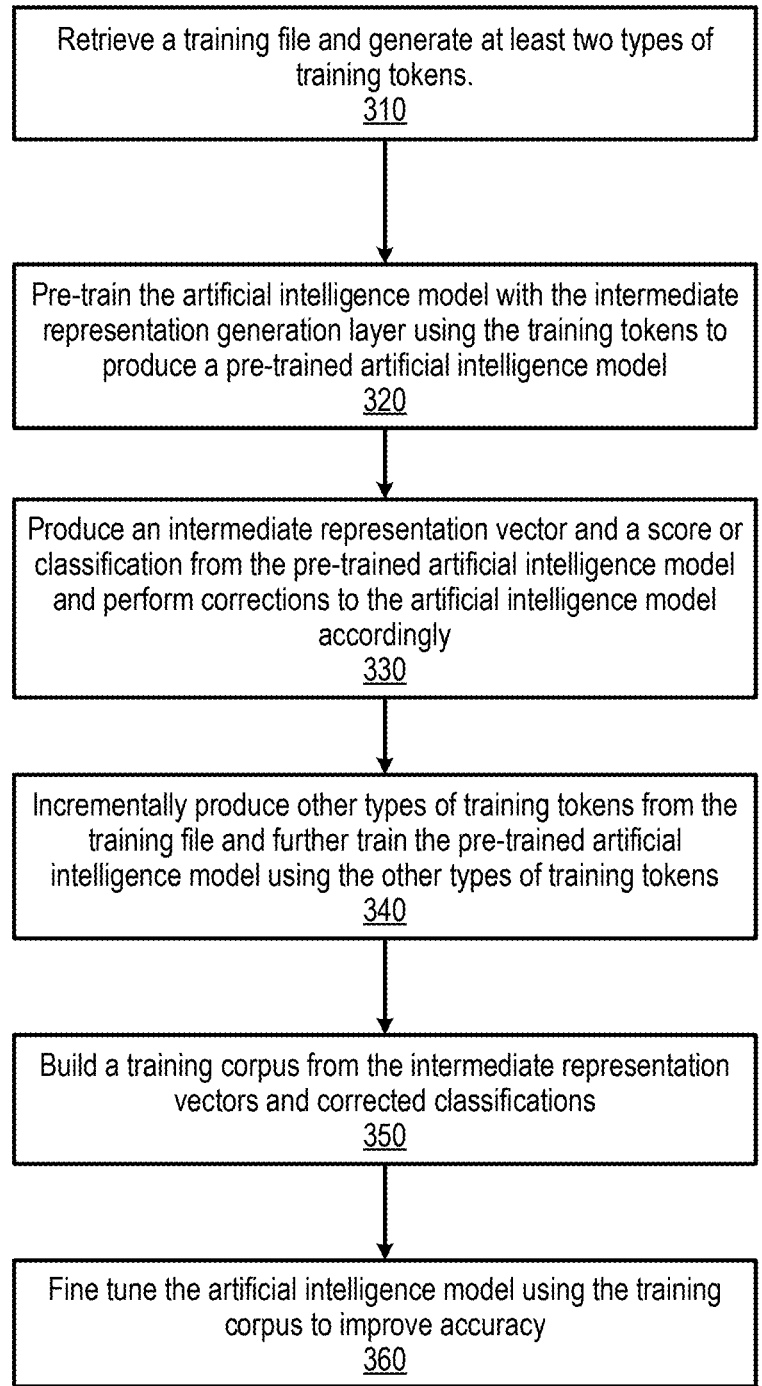

Retrieve a training file and generate at least two types of training tokens.
310

Pre-train the artificial intelligence model with the intermediate representation generation layer using the training tokens to produce a pre-trained artificial intelligence model
320

Produce an intermediate representation vector and a score or classification from the pre-trained artificial intelligence model and perform corrections to the artificial intelligence model accordingly
330

Incrementally produce other types of training tokens from the training file and further train the pre-trained artificial intelligence model using the other types of training tokens
340

Build a training corpus from the intermediate representation vectors and corrected classifications
350

Fine tune the artificial intelligence model using the training corpus to improve accuracy
360

Figure 4:
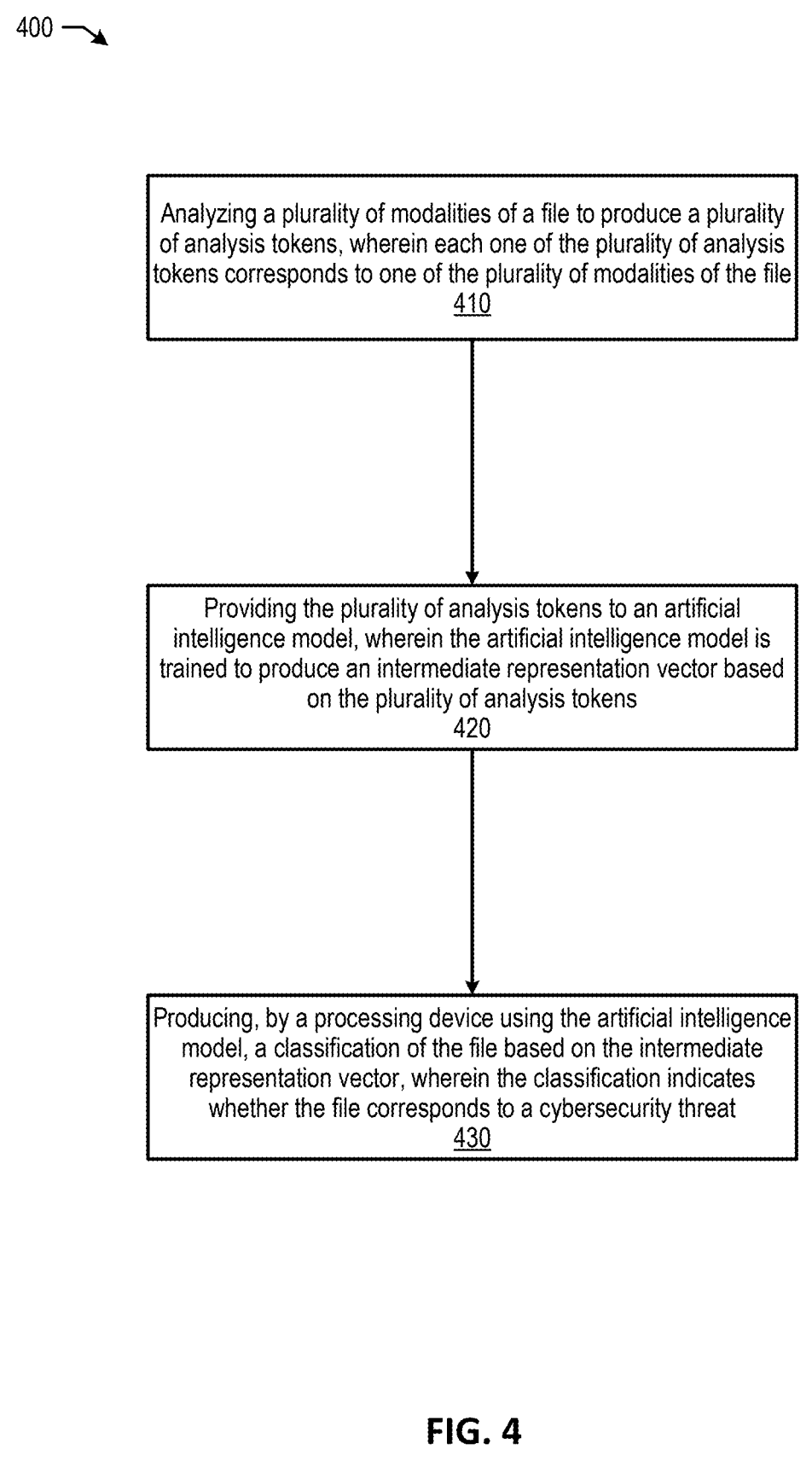

```
┌─────────────────────────────────────────────────────────┐
│ Analyzing a plurality of modalities of a file to produce │
│ a plurality of analysis tokens, wherein each one of the  │
│ plurality of analysis tokens corresponds to one of the   │
│ plurality of modalities of the file                      │
│                        410                               │
└─────────────────────────────────────────────────────────┘
                            │
                            ▼
┌─────────────────────────────────────────────────────────┐
│ Providing the plurality of analysis tokens to an         │
│ artificial intelligence model, wherein the artificial    │
│ intelligence model is trained to produce an intermediate │
│ representation vector based on the plurality of analysis  │
│ tokens                                                   │
│                        420                               │
└─────────────────────────────────────────────────────────┘
                            │
                            ▼
┌─────────────────────────────────────────────────────────┐
│ Producing, by a processing device using the artificial   │
│ intelligence model, a classification of the file based   │
│ on the intermediate representation vector, wherein the   │
│ classification indicates whether the file corresponds to │
│ a cybersecurity threat                                   │
│                        430                               │
└─────────────────────────────────────────────────────────┘
```

USING ARTIFICIAL INTELLIGENCE MODELS WITH INTERMEDIATE REPRESENTATIONS TO ANALYZE MALICIOUS FILES

TECHNICAL FIELD

Aspects of the present disclosure relate to malicious file analysis, and more particularly, to using artificial intelligence models with intermediate representations to analyze malicious files.

BACKGROUND

Cybersecurity refers to the practice of protecting computer systems, networks, and digital assets from theft, damage, unauthorized access, and various forms of cyber threats. Cybersecurity threats encompass a wide range of activities and actions that pose risks to the confidentiality, integrity, and availability of computer systems and data. These threats can include malicious activities such as viruses, ransomware, and hacking attempts aimed at exploiting vulnerabilities in software or hardware. Additionally, cybersecurity threats encompass suspicious activities, such as unusual patterns of network traffic or unauthorized access attempts, which may indicate potential security breaches or weaknesses that require investigation and mitigation.

Malware is software designed with malicious intent to cause intentional harm and/or bypass security measures. Malware is used, for example, by cyber attackers to disrupt computer operations, to access and to acquire sensitive information stored on the computer or provided to the computer, or to perform other actions that are harmful to the computer or user. Malware may be formatted as executable files (e.g., EXE files), dynamic link libraries (DLLs), scripts, steganographic encodings within media files such as images, and/or other types of computer programs, or combinations thereof. Malware authors or distributors frequently disguise or obfuscate malware in attempts to evade detection by malware detection or removal tools.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a flow diagram of a method that trains an artificial intelligence model to produce an intermediate representation vector from multiple types of tokens corresponding to different modalities of a file and produce a classification of the file based on the intermediate representation vector, in accordance with some embodiments of the present disclosure.

FIG. 4 is a flow diagram of a method that analyzes multiple modalities of a file to determine whether the file corresponds to a cybersecurity threat, in accordance with some embodiments of the present disclosure.

DETAILED DESCRIPTION

Figure 1:
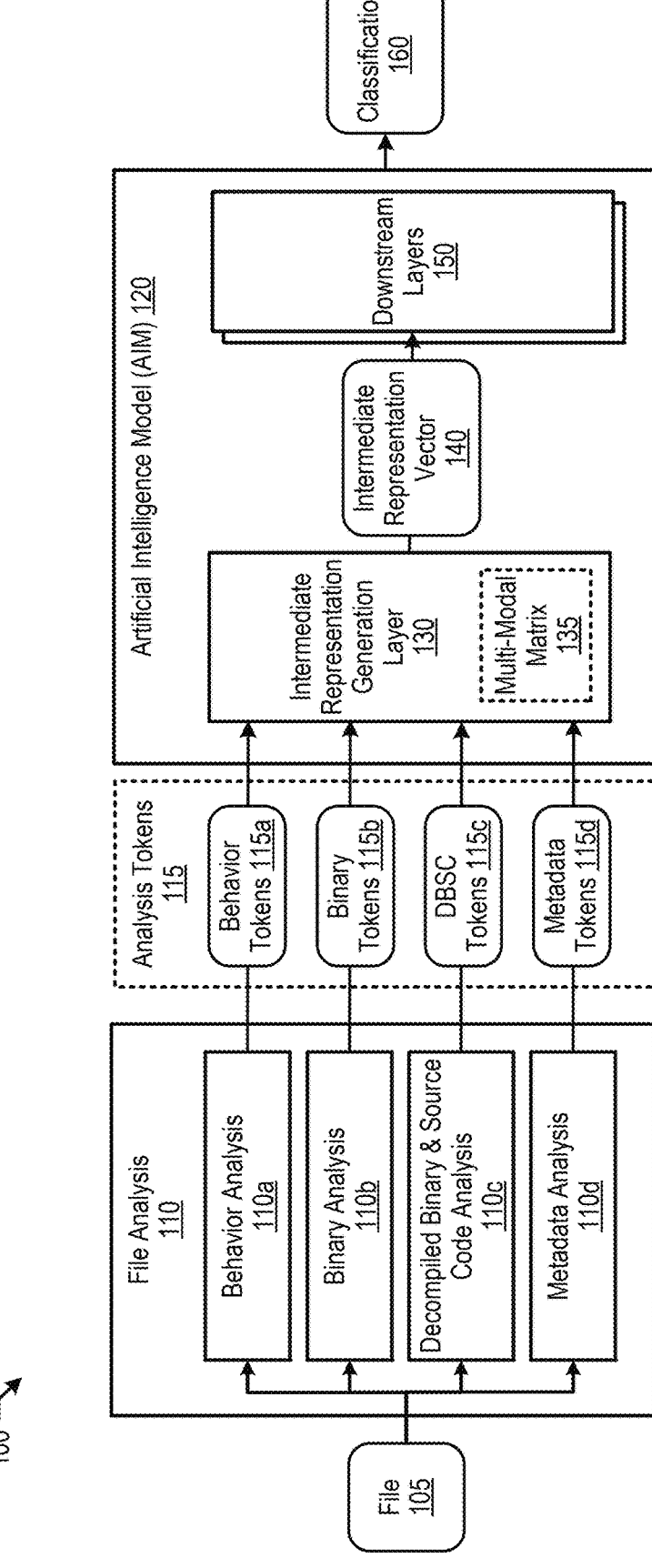
FIG. 1 is a block diagram that illustrates an example system for using an artificial intelligence model to produce an intermediate representation vector based on multiple analysis tokens corresponding to a file and use the intermediate representation vector to determine whether the file corresponds to a cybersecurity threat, in accordance with some embodiments of the present disclosure.

As discussed above, cybersecurity threats encompass a wide range of activities and actions that pose risks to the confidentiality, integrity, and availability of computer systems and data. A challenge found in cybersecurity protection is that malware authors or distributors are becoming more sophisticated in their obfuscation and delivery techniques. Cybersecurity threats are obfuscated in various form factors, often tailored to the target's vulnerability landscape. For example, malware may be embedded in text documents and delivered via email attachments. Ransomware, another form of malware, may be spread via malicious websites or download links. Cybersecurity threats may also be delivered through social engineering techniques, where attackers trick users into providing access or sensitive information. Furthermore, increasingly common Internet of Things (IoT) devices can be a delivery mechanism for cybersecurity threats, given their often weaker security protocols.

Artificial intelligence (AI) is a field of computer science that encompasses the development of systems capable of performing tasks that typically require human intelligence. Machine learning is a branch of artificial intelligence focused on developing algorithms and models that allow computers to learn from data and make predictions or decisions without being explicitly programmed. Machine learning models are the foundational building blocks of machine learning, representing the mathematical and computational frameworks used to extract patterns and insights from data. Large language models, a specialized category within machine learning models, are trained on vast amounts of text data to capture the nuances of language and context. By combining advanced machine learning techniques with enormous datasets, large language models harness data-driven approaches to achieve highly sophisticated language understanding and generation capabilities. As discussed herein, artificial intelligence models, or AI models, include machine learning models, large language models, and other types of models that are based on neural networks, genetic algorithms, expert systems, reinforcement learning, decision trees, or a combination thereof.

Although artificial intelligence models have been used in a wide variety of computer applications, a challenge found with using artificial intelligence models to detect cybersecurity threats is that the artificial intelligence models (e.g., large language models) are trained to process human readable text. As such, artificial intelligence models are not equipped to process other form factors (modalities) of a file where a cybersecurity threat may be hidden. The modality of a file refers to the type of data from the file, and a file may include multiple modalities, such as text data, binary data, executable macros, metadata, etc.

The present disclosure addresses the above-noted and other deficiencies by providing an approach of analyzing multiple modalities of a file to determine whether the file corresponds to a cybersecurity threat. In some embodiments, the approach analyzes the modalities to produce multiple analysis tokens. Each one of the analysis tokens corresponds to a respective modality of the file. The approach provides the analysis tokens to an artificial intelligence model, which is trained to produce an intermediate representation vector based on the analysis tokens. In turn the approach uses the artificial intelligence model to produce, based on the intermediate representation vector, a classification that indicates whether the file corresponds to a cybersecurity threat.

In some embodiments, each of the modalities corresponds to a different type of data, and the approach performs multiple parsings on the file to produce multiple views. Each one of the parsings is based on a corresponding one of modalities of the file. Parsing the file is the process of analyzing the file's data following certain rules or structures based on the corresponding modality and involves the extraction of individual pieces of data and understanding their relationship to each other according to the file's structure or format. The approach then generates the multiple analysis tokens from the multiple views. In some embodiments, each one of the analysis tokens that is provided to the artificial intelligence model is a numerical representation of its corresponding view.

In some embodiments, the approach opens the file and identifies behaviors in response to opening the file. The approach parses the behaviors to produce a behavior view and, in turn, generates behavior tokens based on the behavior view. In some embodiments, the artificial intelligence model includes an intermediate representation layer. The intermediate representation layer applies a numerical operation to the analysis tokens to produce the intermediate representation vector. The numerical operation is based on a multi-modal matrix trained on different types of training tokens that correspond to the modalities of the file.

In some embodiments, the approach generates first training tokens and second training tokens based on a training file, which correspond to first modality and a second modality of the training file, respectively. The approach pre-trains the artificial intelligence model using the first training tokens and the second training tokens to produce a pretrained artificial intelligence model. Then, the approach generates third training tokens corresponding to a third modality of the training file, and trains the pre-trained artificial intelligence model using the third training tokens.

In some embodiments, the approach assigns a file category to the file based on the intermediate representation vector, which is a compressed representation of the file. The approach determines a file group that corresponds to the file category and, in turn, stores the file in the file group.

As discussed herein, the present disclosure provides an approach that improves the operation of a computer system by enabling an artificial intelligence model to use multiple modalities of a file in determining whether the file corresponds to a cybersecurity threat. In addition, the present disclosure provides an improvement to the technological field of cybersecurity prevention by detecting a cybersecurity threat regardless of its underlying modality.

FIG. 1 is a block diagram that illustrates an example system for using an artificial intelligence model to produce an intermediate representation vector based on multiple analysis tokens corresponding to a file and use the intermediate representation vector to determine whether the file corresponds to a cybersecurity threat, in accordance with some embodiments of the present disclosure.

System 100 receives file 105 and performs file analysis 110 on file 105 to produce analysis tokens 115. File analysis 110 includes multiple approaches of analyzing file 105 based on different modalities of file 105, such as behavior analysis 110a, binary analysis 110b, decompiled binary and source code (DBSC) analysis 110c, and metadata analysis 110d. Each of the different file analysis approaches use different parsers corresponding to the different modalities of file 105 to produce different views, which are then tokenized to produce analysis tokens 115. As discussed herein, file analysis 110 performs upfront operations as appropriate to transform data in file 105 (or portions thereof) into different formats consistent with the corresponding type of analysis (see FIG. 2 and corresponding text for further details).

Behavior analysis 110a opens or executes file 105 and captures its corresponding behavior, such as calling a macro or requesting port access. In some embodiments, behavior analysis 110a stores the captured behavior in a log file (e.g., behavior log 205 shown in FIG. 2). Behavior analysis 110a then uses a behavior parser to parse the log file and create a behavior view. In turn, behavior analysis 110a uses a token generator to tokenize the behavior view and generate behavior tokens 115a (a vector of behavior tokens). In some embodiments, behavior analysis include behavior that was logged during instance(s) of suspected attacks (e.g., network connections opened during a single instance) to produce a bespoke classification for the instance(s) of suspected attack. In addition, metadata may be gathered from the instance(s) of attack and may include information such as geolocation of a download source of the file corresponding to the attack(s). As such, file analysis 110 extends to include sources beyond file 105. Furthermore, training may then be performed on a corpus of data from multiple instances and include live 'in the field' detonations that are captured by security tools to consider.

Binary analysis 110b uses a binary parser to parse file 105 and create a binary view. Then, binary analysis 11b uses a token generator to tokenize the binary view and generate binary tokens 115b (a vector of binary tokens). Decompiled binary and source code (DBSC) analysis 110c is focused on understanding the intricacies of a program's logic and behavior by examining its source code. DBSC analysis 110c uses a decompiler to translate binary information of a compiled file in file 105 (e.g., macros) back into a higher-level language that is more comprehensible. Then, DBSC analysis 110c uses a parser create a DBSC view. DBSC analysis 110c then uses a token generator to create DBSC tokens 115c (a vector of DBSC tokens) from the DBSC view (see FIG. 2 and corresponding text for further details).

Metadata analysis 110d involves parsing file 105 to identify and extract its metadata information such as file size, creation date, modification date, author, format, and possibly geolocation, among other attributes depending on the file type. By analyzing these data points, metadata analysis 110d gains valuable insights about file 105's origins, history, and usage patterns. Additionally, anomalies in metadata can often hint at potential security threats or irregularities. Metadata analysis 110d generates a metadata view from the metadata parsing, and then generates metadata tokens 115d (a vector of metadata tokens) from the metadata view using a token generator (see FIG. 2 and corresponding text for further details).

Analysis tokens 115 feed into artificial intelligence model 120. In some embodiments, analysis tokens 115 are numerical representations of their corresponding views. Artificial intelligence model 120 includes intermediate representation generation layer 130. Intermediate representation generation layer 130 is trained to produce an intermediate representation vector 140 based on analysis tokens 115. In one embodiment, intermediate representation vector 140 is a tensor (multidimensional array(s) to store numerical data) in a form such as a vector(s), matrix, or a combination thereof. In one embodiment, intermediate representation generation layer 130 applies a numerical operation to analysis tokens 115 to produce intermediate representation vector 140 (e.g., concatenate, average, etc.). In one embodiment, intermediate representation generation layer 130 includes multi-modal matrix 135 to formulate a numerical operation to apply to analysis tokens 115. The multi-modal matrix 135 includes definitions that unify the different types of analysis tokens (see FIG. 3 and corresponding text for further details). In one embodiment, multi-modal matrix 135 is a tensor in a form such as a vector(s), matrix, or a combination thereof.

Intermediate representation vector 140 feeds into downstream layers 150 of artificial intelligence model 120 (e.g., activation layer, normalization layer, etc.), which are trained to use the intermediate representation vector to determine whether a cybersecurity threat exists in file 105. As such, artificial intelligence model 120 produces classification 160, which indicates whether file 105 corresponds to a cybersecurity threat.

Figure 2:
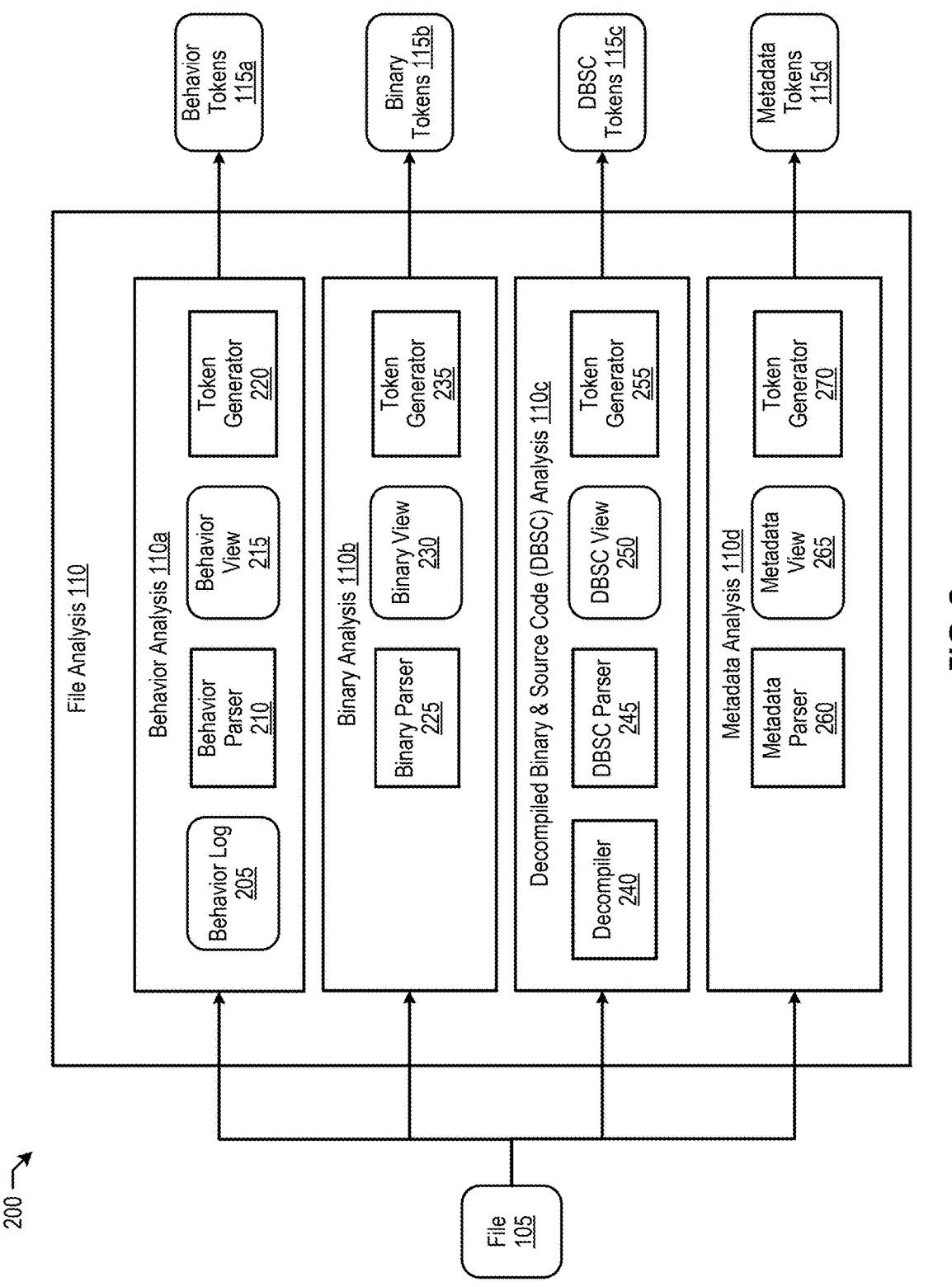
FIG. 2 is a block diagram that illustrates an example system for performing multi-faceted file analysis on a file to generate multiple types of tokens corresponding to various modalities of the file, in accordance with some embodiments of the present disclosure.

FIG. 2 is a block diagram that illustrates an example system for performing multi-faceted file analysis on a file to generate multiple types of tokens corresponding to various modalities of the file, in accordance with some embodiments of the present disclosure.

Behavior analysis 110a on file 105 involves examining the actions or operations that file 105 performs when opened, executed, or a combination thereof, which can be a key indicator when dealing with potentially harmful files that include malware. Behavior analysis 110a opens file 105 and captures its behavior, such as how it interacts with the operating system, which system resources it accesses, what changes it makes, whether it opens any network connections, and so on. Behavior analysis 110a then stores the captured behavior, such as in behavior log 205. Next, behavior parser 210 breaks down the behavior into more manageable segments based on predefined rules or structures of a behavior modality. Once behavior parser 210 has processed the behavior, behavior analysis 110a creates behavior view 215, which provides a structured representation of the file's behavior. In turn, token generator 220 creates behavior tokens 115a from behavior view 215. Behavior tokens 115a include information extracted from behavior view 215 that represents the file's behavior. For example, behavior tokens 115a may represent a system resource the file accesses, or a particular operation that behavior tokens 115a perform when open, executed, or a combination thereof.

Binary analysis 110b uses binary parser 225 to interpret the raw binary data in file 105 and organize the data according to certain predefined rules or structures of a binary modality. Binary analysis 110b then creates binary view 230 from the results of binary parser 225. Binary view 230 is a structured representation of the data, allowing for an easier understanding of the binary data. Token generator 235 then creates a numerical representation (binary tokens 115b) of binary view 230. In one embodiment, binary tokens 115b may represent a pattern or a sequence in binary view 230. For example, binary view 230 may identify a particular command or operation in an executable file, or a recurring sequence in an image or audio file.

Decompiled binary and source code (DBSC) analysis 110c is a process used for understanding the underlying functionality and structure of file 105. Decompiled binary and source code analysis 110c uses decompiler 240 to translate binary information of a compiled file in file 105 (e.g., macros) back into a higher-level language that is more comprehensible. Decompiler 240 takes a binary executable and recreates the corresponding source code. Then, decompiled binary and source code analysis 110c uses DBSC parser 245 to create DBSC view 250. DBSC view 250 is a structured view of the decompiled code. In one embodiment, DBSC view 250 may represent the code's structure in a tree-like format such as an Abstract Syntax Tree (AST). In turn, token generator 255 creates DBSC tokens 115c from DBSC view 250, which is a numerical representation of DBSC view 250.

Metadata analysis 110d uses metadata parser 260 to examine the metadata modality of file 105 and extract metadata, which can include the author, creation date, modification date, and other key pieces of information. Metadata analysis 110d then creates metadata view 265 from the extracted metadata. Metadata view 265 is a representation of the metadata that provides a summarized perspective, allowing a program to understand the metadata without having to sift through the entire file 105. Token generator 270 then creates metadata tokens 115d from metadata view 265, which is a numerical representation of metadata view. In one embodiment, file analysis 110 performs more, less, different, or a combination thereof, analysis of file 105 to produce more, less, different, or a combination thereof, tokens.

FIG. 3 is a flow diagram of a method that trains an artificial intelligence model to produce an intermediate representation vector from multiple types of tokens corresponding to different modalities of a file and produce a classification of the file based on the intermediate representation vector, in accordance with some embodiments of the present disclosure. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by processing device 510 (shown in FIG. 5), processing device 602 (shown in FIG. 6), or a combination thereof.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

With reference to FIG. 3, method 300 begins at block 310, where processing logic retrieves a training file and generates at least two types of training tokes from the file. For example, processing logic may generate binary tokens and metadata tokens corresponding to a binary view and a metadata view, respectively, as discussed herein.

At block 320, processing logic pre-trains the artificial intelligence using the generated tokens. In one embodiment, processing logic performs several iterations to train the intermediate representation generation layer (includes multi-modal matrix 135) in the artificial intelligence model. In one embodiment, processing logic begins pre-training the artificial intelligence model using a portion of the different types of tokens so as to not have to wait until each of the different types of tokens discussed herein are generated and verified. Then, processing logic adds new token types at a time for a subsequent training step to progressively enrich the intermediate representation generation layer and overall artificial intelligence model. In turn, processing logic may train with noisier data and focus on collecting fewer examples for training. In one embodiment, processing logic may use four token types at once during training when all four token types are annotated and validated to be correct.

At block 330, processing logic produces an intermediate representation, a score, a classification, or a combination thereof, during the pre-training. In one embodiment, processing logic also performs corrections to the training process and artificial intelligence model accordingly.

At block 340, processing logic produces other types of training tokens from the training file and further trains the pre-trained artificial intelligence model using the other types of training tokens. For example, processing logic may have pre-trained the artificial intelligence model using binary tokens and metadata tokens, and then trains the artificial intelligence model using behavior tokens and decompiled binary and source code tokens corresponding to the same file.

At block 350, processing logic builds a training corpus from the intermediate representations and corrected classifications and, at block 360, processing logic fine tunes the artificial intelligence model using the training corpus to improve the accuracy of the artificial intelligence model with the intermediate representation generation layer.

FIG. 4 is a flow diagram of a method that analyzes multiple modalities of a file to determine whether the file corresponds to a cybersecurity threat, in accordance with some embodiments of the present disclosure. Method 400 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of method 400 may be performed by artificial intelligence model 120 (shown in FIG. 1), processing device 510 (shown in FIG. 5), processing device 602 (shown in FIG. 6), or a combination thereof.

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

With reference to FIG. 4, method 400 begins at block 410, whereupon processing logic analyzes a plurality of modalities of a file to produce a plurality of analysis tokens. Each one of the plurality of analysis tokens corresponds to one of the plurality of modalities of the file. For example, processing logic may produce behavior tokens, binary tokens, decompiled binary and source code tokens, and metadata tokens as discussed here.

At block 420, processing logic provides the plurality of analysis tokens to an artificial intelligence model that is trained to produce an intermediate representation vector based on the plurality of analysis tokens. In one embodiment, processing logic also provides other tokens to the artificial intelligence model, such as tokens that represent up-to-date threat intelligence reports.

At block 430, processing logic uses the artificial intelligence model to produce a classification of the file based on the intermediate representation vector. The classification indicates whether the file corresponds to a cybersecurity threat. For example, classification may indicate that the file is malicious or benign.

Figure 5:
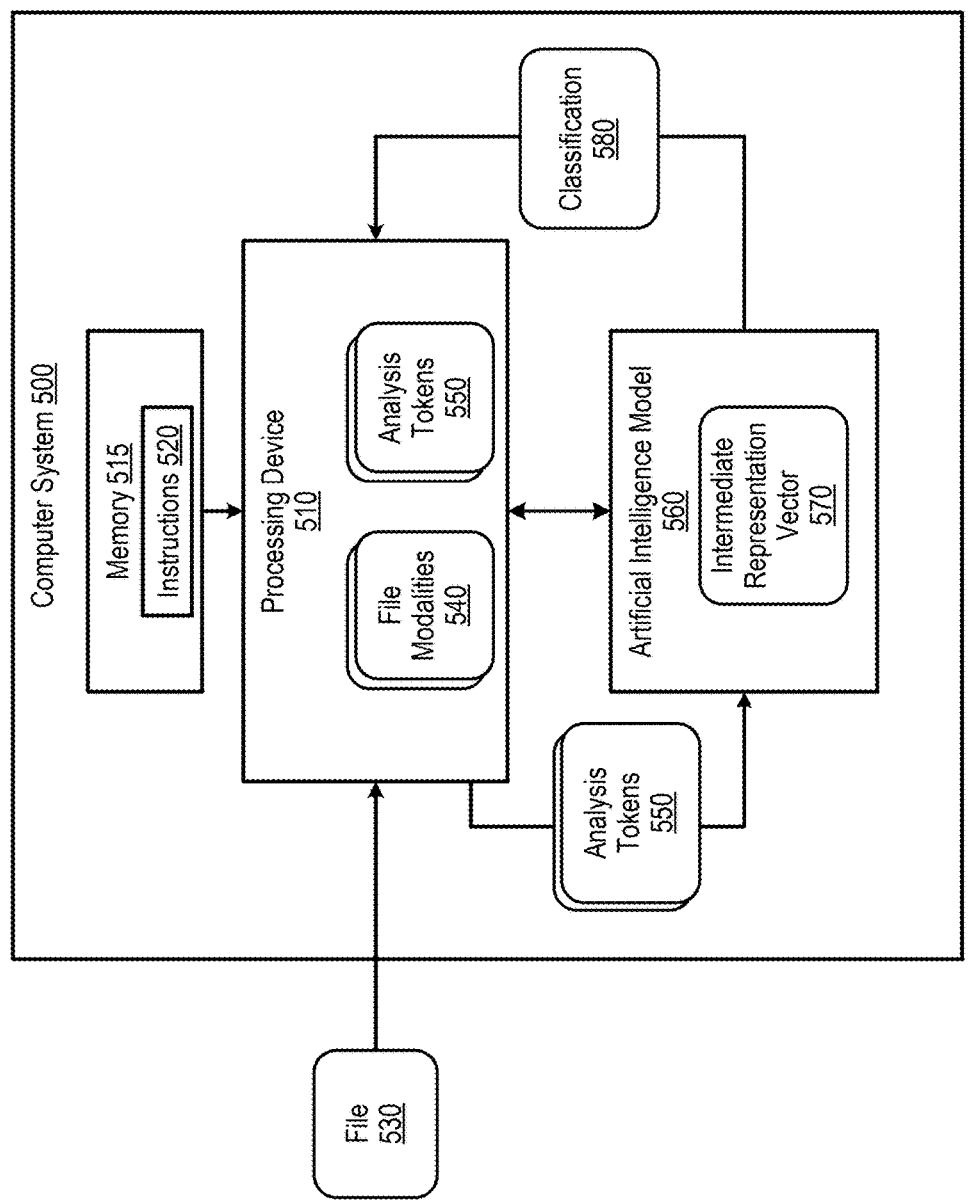
FIG. 5 is a block diagram that illustrates an example system for analyzing multiple modalities of a file to determine whether the file corresponds to a cybersecurity threat, in accordance with some embodiments of the present disclosure.

FIG. 5 is a block diagram that illustrates an example system for analyzing multiple modalities of a file to determine whether the file corresponds to a cybersecurity threat, in accordance with some embodiments of the present disclosure.

Computer system 500 includes processing device 510 and memory 515. Memory 515 stores instructions 520 that are executed by processing device 510. Instructions 520, when executed by processing device 510, cause processing device 510 to analyze file modalities 540 corresponding to file 530 and produce analysis tokens 550. Each one of analysis tokens 550 corresponds to one of file modalities 540.

Processing device 510 provides analysis tokens 550 to artificial intelligence model 560, which is trained to produce intermediate representation vector 570 based on the plurality of analysis tokens 550. In one embodiment, processing device applies a numerical operation to analysis tokens 550 to produce intermediate representation vector 570, such as a concatenation, an averaging, etc. In one embodiment, a multi-modal matrix 135 is used to formulate the numerical operation. Processing device 510 then uses artificial intelligence model 560 to produce classification 580 based on intermediate representation vector 570. Classification 580 indicates whether the file corresponds to a cybersecurity threat. In one embodiment, processing device 510 sends a security notification when classification 580 indicates that file 530 corresponds to a cybersecurity threat.

Figure 6:
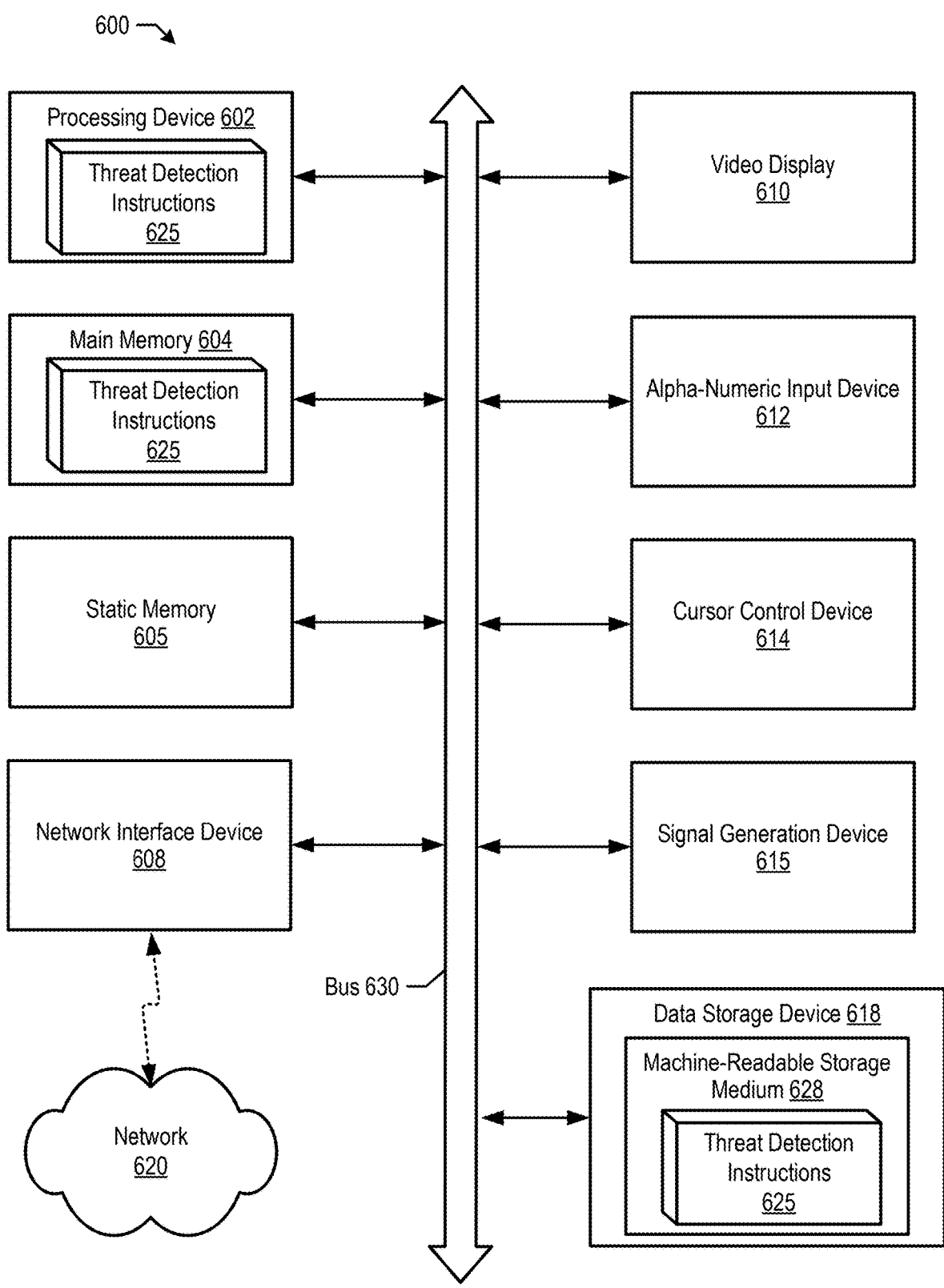
FIG. 6 is a block diagram of an example computing device that may perform one or more of the operations described herein, in accordance with some embodiments of the present disclosure.

FIG. 6 illustrates a diagrammatic representation of a machine in the example form of a computer system 600 within which a set of instructions, for causing the machine to perform any one or more of the methodologies discussed herein for threat detection in files.

In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618 which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Computer system 600 may further include a network interface device 608 which may communicate with a network 620. Computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In some embodiments, video display unit 610, alphanumeric input device 612, and cursor control device 614 may be combined into a single component or device (e.g., an LCD touch screen).

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute threat detection instructions 625, for performing the operations and steps discussed herein.

The data storage device 618 may include a machine-readable storage medium 628, on which is stored one or more sets of threat detection instructions 625 (e.g., software) embodying any one or more of the methodologies of functions described herein. The threat detection instructions 625 may also reside, completely or at least partially, within the main memory 604 or within the processing device 602 during execution thereof by the computer system 600; the main memory 604 and the processing device 602 also constituting machine-readable storage media. The threat detection instructions 625 may further be transmitted or received over a network 620 via the network interface device 608.

The machine-readable storage medium 628 may also be used to store instructions to perform a method for intelligently scheduling containers, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Unless specifically stated otherwise, terms such as "analyzing," "providing," "producing," "performing," "generating," "opening," "identifying," "parsing," "applying," "training," "pre-training," "assigning," "determining," "storing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to"

perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112(f) for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:
analyzing a plurality of modalities of a file to produce a plurality of analysis tokens, wherein each one of the plurality of analysis tokens corresponds to a respective modality of the plurality of modalities of the file, wherein one of the plurality of modalities corresponds to decompiled binary and source code (DBSC) obtained by decompiling an executable macro embedded in the file;
providing the plurality of analysis tokens to an artificial intelligence model, wherein the artificial intelligence model is trained to produce an intermediate representation vector based on the plurality of analysis tokens; and
producing, by a processing device using the artificial intelligence model, a classification of the file based on the intermediate representation vector, wherein the classification indicates whether the file corresponds to a cybersecurity threat.

2. The method of claim 1, wherein each of the plurality of modalities corresponds to a different type of data, and wherein analyzing the plurality of modalities further comprises:
performing a plurality of parsings on the file to produce a plurality of views, wherein each one of the plurality of parsings is based on a respective modality of the plurality of modalities of the file; and
generating the plurality of analysis tokens from the plurality of views.

3. The method of claim 2, wherein each one of the plurality of analysis tokens provided to the artificial intelligence model is a numerical representation of its respective view of the plurality of views.

4. The method of claim 1, further comprising:
opening the file;
identifying one or more behaviors in response to opening the file;
parsing the one or more behaviors to produce a behavior view; and
generating behavior tokens based on the behavior view, wherein the plurality of analysis tokens comprise the behavior tokens.

5. The method of claim 1, wherein the artificial intelligence model comprises an intermediate representation layer, the method further comprising:
applying, by the intermediate representation layer, a numerical operation to the plurality of analysis tokens to produce the intermediate representation vector, wherein the numerical operation is based on a multimodal matrix trained on different types of training tokens that correspond to the plurality of modalities of the file.

6. The method of claim 5, further comprising:
training the artificial intelligence model, wherein the training further comprises:
generating, based on a training file, first training tokens and second training tokens, wherein the first training tokens and the second training tokens correspond to first modality and a second modality of the training file;
pre-training the artificial intelligence model using the first training tokens and the second training tokens to produce a pretrained artificial intelligence model;
generating, based on the training file, third training tokens corresponding to a third modality of the training file; and
training the pre-trained artificial intelligence model using the third training tokens.

7. The method of claim 1, further comprising:
assigning a file category to the file based on the intermediate representation vector, wherein the intermediate representation vector is a compressed representation of the file;
determining a file group that corresponds to the file category; and
storing the file in the file group.

8. A system comprising:
a processing device; and
a memory to store instructions that, when executed by the processing device cause the processing device to:
analyze a plurality of modalities of a file to produce a plurality of analysis tokens, wherein each one of the plurality of analysis tokens corresponds to a respective modality of the plurality of modalities of the file, wherein one of the plurality of modalities corresponds to decompiled binary and source code (DBSC) obtained by decompiling an executable macro embedded in the file;

provide the plurality of analysis tokens to an artificial intelligence model, wherein the artificial intelligence model is trained to produce an intermediate representation vector based on the plurality of analysis tokens; and produce, using the artificial intelligence model, a classification of the file based on the intermediate representation vector, wherein the classification indicates whether the file corresponds to a cybersecurity threat.

9. The system of claim 8, wherein each of the plurality of modalities corresponds to a different type of data, and wherein the processing device, responsive to executing the instructions, further causes the system to:

perform a plurality of parsings on the file to produce a plurality of views, wherein each one of the plurality of parsings is based on a respective modality of the plurality of modalities of the file; and generate the plurality of analysis tokens from the plurality of views.

10. The system of claim 9, wherein each one of the plurality of analysis tokens provided to the artificial intelligence model is a numerical representation of its respective view of the plurality of views.

11. The system of claim 8, wherein the processing device, responsive to executing the instructions, further causes the system to:

open the file;

identify one or more behaviors in response to opening the file;

parse the one or more behaviors to produce a behavior view; and generate behavior tokens based on the behavior view, wherein the plurality of analysis tokens comprise the behavior tokens.

12. The system of claim 8, wherein the artificial intelligence model comprises an intermediate representation layer, and wherein the processing device, responsive to executing the instructions, further causes the system to:

apply, by the intermediate representation layer, a numerical operation to the plurality of analysis tokens to produce the intermediate representation vector, wherein the numerical operation is based on a multi-modal matrix trained on different types of training tokens that correspond to the plurality of modalities of the file.

13. The system of claim 12, wherein the processing device, responsive to executing the instructions, further causes the system to:

generate, based on a training file, first training tokens and second training tokens, wherein the first training tokens and the second training tokens correspond to first modality and a second modality of the training file;

pre-train the artificial intelligence model using the first training tokens and the second training tokens to produce a pretrained artificial intelligence model;

generate, based on the training file, third training tokens corresponding to a third modality of the training file; and train the pre-trained artificial intelligence model using the third training tokens.

14. The system of claim 8, wherein the processing device, responsive to executing the instructions, further causes the system to:

assign a file category to the file based on the intermediate representation vector, wherein the intermediate representation vector is a compressed representation of the file;

determine a file group that corresponds to the file category; and storing the file in the file group.

15. A non-transitory computer readable medium, having instructions stored thereon which, when executed by a processing device, cause the processing device to:

analyze a plurality of modalities of a file to produce a plurality of analysis tokens, wherein each one of the plurality of analysis tokens corresponds to a respective modality of the plurality of modalities of the file, wherein one of the plurality of modalities corresponds to decompiled binary and source code (DBSC) obtained by decompiling an executable macro embedded in the file;

provide the plurality of analysis tokens to an artificial intelligence model, wherein the artificial intelligence model is trained to produce an intermediate representation vector based on the plurality of analysis tokens; and produce, by the processing device using the artificial intelligence model, a classification of the file based on the intermediate representation vector, wherein the classification indicates whether the file corresponds to a cybersecurity threat.

16. The non-transitory computer readable medium of claim 15, wherein each of the plurality of modalities corresponds to a different type of data, and wherein the processing device is to:

perform a plurality of parsings on the file to produce a plurality of views, wherein each one of the plurality of parsings is based on a respective modality of the plurality of modalities of the file; and generate the plurality of analysis tokens from the plurality of views.

17. The non-transitory computer readable medium of claim 16, wherein each one of the plurality of analysis tokens provided to the artificial intelligence model is a numerical representation of its respective view of the plurality of views.

18. The non-transitory computer readable medium of claim 15, wherein the processing device is to:

open the file;

identify one or more behaviors in response to opening the file;

parse the one or more behaviors to produce a behavior view; and generate behavior tokens based on the behavior view, wherein the plurality of analysis tokens comprise the behavior tokens.

19. The non-transitory computer readable medium of claim 15, wherein the artificial intelligence model comprises an intermediate representation layer, and wherein the processing device is to:

apply, by the intermediate representation layer, a numerical operation to the plurality of analysis tokens to produce the intermediate representation vector, wherein the numerical operation is based on a multi-modal matrix trained on different types of training tokens that correspond to the plurality of modalities of the file.

20. The non-transitory computer readable medium of claim 19, wherein the processing device is to:

generate, based on a training file, first training tokens and second training tokens, wherein the first training tokens and the second training tokens correspond to first modality and a second modality of the training file;

pre-train the artificial intelligence model using the first training tokens and the second training tokens to produce a pretrained artificial intelligence model;

generate, based on the training file, third training tokens corresponding to a third modality of the training file; and train the pre-trained artificial intelligence model using the third training tokens.

\* \* \* \* \*